(12) United States Patent
Li et al.

(10) Patent No.: US 9,310,640 B2
(45) Date of Patent: Apr. 12, 2016

(54) DISPLAY DEVICE

(71) Applicants: CHENGDU BOE OPTOELECTRONICS TECHNOLOGY CO., LTD., Chengdu, Sichuan (CN); BOE TECHNOLOGY GROUP CO., LTD., Beijing (CN)

(72) Inventors: Fan Li, Beijing (CN); Xiaomei Huang, Beijing (CN)

(73) Assignees: CHENGDU BOE OPTOELECTRONICS TECHNOLOGY CO., LTD., Chengdu, Sichuan (CN); BOE TECHNOLOGY GROUP CO., LTD., Beijing (CN)

( * ) Notice: Subject to any disclaimer, the term of this patent is extended or adjusted under 35 U.S.C. 154(b) by 118 days.

(21) Appl. No.: 14/235,270

(22) PCT Filed: Jun. 14, 2013

(86) PCT No.: PCT/CN2013/077251
§ 371 (c)(1),
(2) Date: Jan. 27, 2014

(87) PCT Pub. No.: WO2014/153851
PCT Pub. Date: Oct. 2, 2014

(65) Prior Publication Data
US 2014/0333865 A1 Nov. 13, 2014

(30) Foreign Application Priority Data

Mar. 29, 2013 (CN) .......................... 2013 1 0109373

(51) Int. Cl.
*G02F 1/1335* (2006.01)
*G02B 27/02* (2006.01)

(52) U.S. Cl.
CPC ........ *G02F 1/133526* (2013.01); *G02B 27/028* (2013.01); *G02F 2001/133562* (2013.01)

(58) Field of Classification Search
CPC ................ G02B 27/028; G02F 1/1335; G02F 1/133526
USPC .......................................................... 349/74
See application file for complete search history.

(56) References Cited

U.S. PATENT DOCUMENTS 5,973,844 A * 10/1999 Burger ........................... 359/622
7,845,825 B2 * 12/2010 Ramer et al. ................... 362/231

(Continued)

FOREIGN PATENT DOCUMENTS

| CN | 1447930 A | 10/2003 |
| CN | 101965604 A | 2/2011 |

(Continued)

OTHER PUBLICATIONS

First Chinese Office Action Appln. No. 201310109373.8 Dated Jan. 13, 2015.

(Continued)

*Primary Examiner* — Sang V Nguyen
(74) *Attorney, Agent, or Firm* — Ladas & Parry LLP

(57) ABSTRACT

Embodiments of the present invention relate to a display device, and the display device, comprising: a display panel, comprising a display region and a peripheral region around the display region; and an optical module, disposed on a light-exiting side of the display panel, the optical module configured to shift light emitted from the display panel towards edges of the display panel so as to make a part of the light shift into the peripheral region and emit from the peripheral region.

15 Claims, 2 Drawing Sheets

(56) References Cited

U.S. PATENT DOCUMENTS

| | | | |
|---|---|---|---|
| 2003/0011303 A1* | 1/2003 | Matthies et al. | 313/506 |
| 2006/0077544 A1* | 4/2006 | Stark | 359/448 |
| 2006/0238440 A1* | 10/2006 | Kim | G02F 1/133526 345/1.1 |
| 2011/0025594 A1* | 2/2011 | Watanabe | G02F 1/13336 345/102 |
| 2011/0057861 A1* | 3/2011 | Cok et al. | 345/1.3 |
| 2011/0242686 A1* | 10/2011 | Watanabe | 359/804 |
| 2012/0008340 A1* | 1/2012 | Tomotoshi et al. | 362/616 |
| 2014/0002331 A1* | 1/2014 | Yoo | 345/76 |
| 2014/0307197 A1* | 10/2014 | Moriwaki | G09F 9/30 349/58 |

FOREIGN PATENT DOCUMENTS

| | | | | |
|---|---|---|---|---|
| CN | 102257549 A | 11/2011 | | |
| JP | PCT/JP2012/002765 | * | 4/2012 | G09F 9/00 |
| WO | WO/2012/147323 | * | 11/2012 | G09F 9/00 |

OTHER PUBLICATIONS

International Search Report mailed Jan. 23, 2014; PCT/CN2013/077251.
Second Chinese Office Action dated Jun. 17, 2015; Appln. No. 201310109373.8.
International Preliminary Report on Patentability Appln. No. PCT/CN2013/077251; Dated Sep. 29, 2015.

* cited by examiner

DISPLAY DEVICE

TECHNICAL FIELD

Embodiments of the present invention relate to a display device

BACKGROUND

A liquid crystal display device is a kind of currently most common flat-panel display, and a thin film transistor liquid crystal display device (TFT-LCD) is a main stream product in the liquid crystal display device.

A liquid crystal display panel is an important component of the liquid crystal display device. The liquid crystal display panel is formed by bonding an array substrate and a color filter substrate through a cell-assembling process and filling a liquid crystal layer between the array substrate and the color filter substrate.

The liquid crystal display panel has a display region and a peripheral region around the display region. The peripheral region is located at an edge of the liquid crystal display panel. A lead-wire of the liquid crystal display panel is typically disposed in the peripheral region and therefore a frame needs to be formed outside the peripheral region. The peripheral region can not display an image but occupies a certain area, hence impacting the visual effect of the entire liquid crystal display device.

SUMMARY

Embodiments of the present invention provide a display device capable of improving the visual effect thereof.

Embodiments of the present invention provide a display device, comprising: a display panel, comprising a display region and a peripheral region around the display region; and an optical module, disposed on a light-exiting side of the display panel, the optical module configured to shift light emitted from the display panel towards edges of the display panel so as to make a part of the light shift into the peripheral region and emit from the peripheral region.

Optionally, the optical module comprises a refracting layer with a refractive index greater than that of air, and the refracting layer is configured to refract light emitted from the display panel to shift the light towards the edges of the display panel.

Optionally, the optical module further comprises air layers sandwiching each of the refracting layers and having refractive index equal to that of air, and the air layers are configured to transmit the light emitted from the display panel to the refracting layer.

Optionally, the optical module comprises a plurality of refracting layers arranged successively on a light-exiting surface of the display panel in a width direction of the display panel and a length direction of the display panel.

Optionally, the set distance h satisfies a formula:

$$h = \frac{d}{\sqrt{1 - \left(\frac{\sin A}{n}\right)^2}} \cdot \sin(A - B),$$

wherein d is a thickness of each of the refracting layers, n is a refractive index of each of the refracting layers, A is an incident angle of light entering into each of the refracting layers, B is an refraction angle of the light in each of the refracting layers, and the incident angle is equal to the set angle.

Optionally, a cross-sectional shape of each of the refracting layers is diamond.

Optionally, refractive indexes of the plurality of refracting layers are identical.

Optionally, the plurality of refracting layers are symmetrically arranged about a central axis of said display panel.

Optionally, in a direction from the central axis to the peripheral region, the thickness of the refracting layer becomes larger and larger.

Optionally, the display panel includes a liquid crystal display panel, an organic electroluminescence display panel or an electronic paper.

BRIEF DESCRIPTION OF THE DRAWINGS

For better understanding technical proposals according to embodiments of the present invention, drawings of the embodiments will be described briefly below. Obviously, drawings in the following description only relate to some embodiments of the present invention, not to limit the present invention.

DETAILED DESCRIPTION

In order to make objects, technical details and advantages of the embodiments of the invention apparent, the technical solutions of the embodiment will be described in a clearly and fully understandable way in connection with the drawings related to the embodiments of the invention. It is obvious that the described embodiments are just a part but not all of the embodiments of the invention. Based on the described embodiments herein, those skilled in the art can obtain other embodiment(s), without any inventive work, which should be within the scope of the invention.

In order to enable one skilled in the art to better understand the technical solution of the present invention, a display device provided in embodiments of the present invention will be described in detail below with reference to the drawings.

Figure 1:
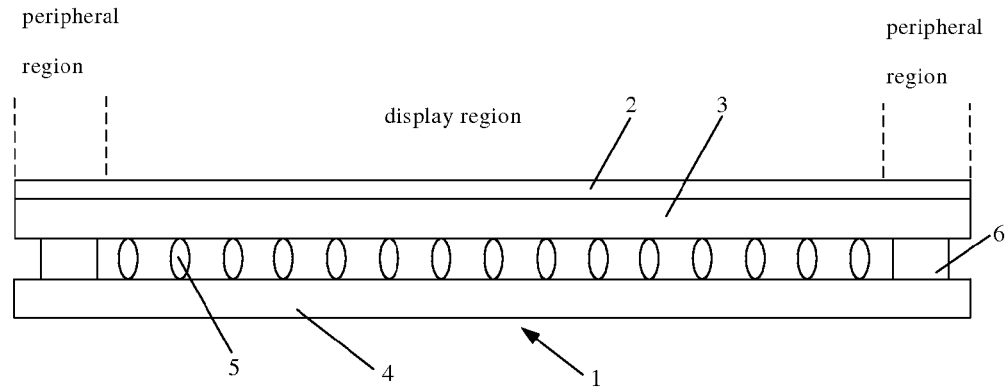
FIG. 1 is a cross-sectional structural view of a display device according to an embodiment of the present invention.
Figure 2:
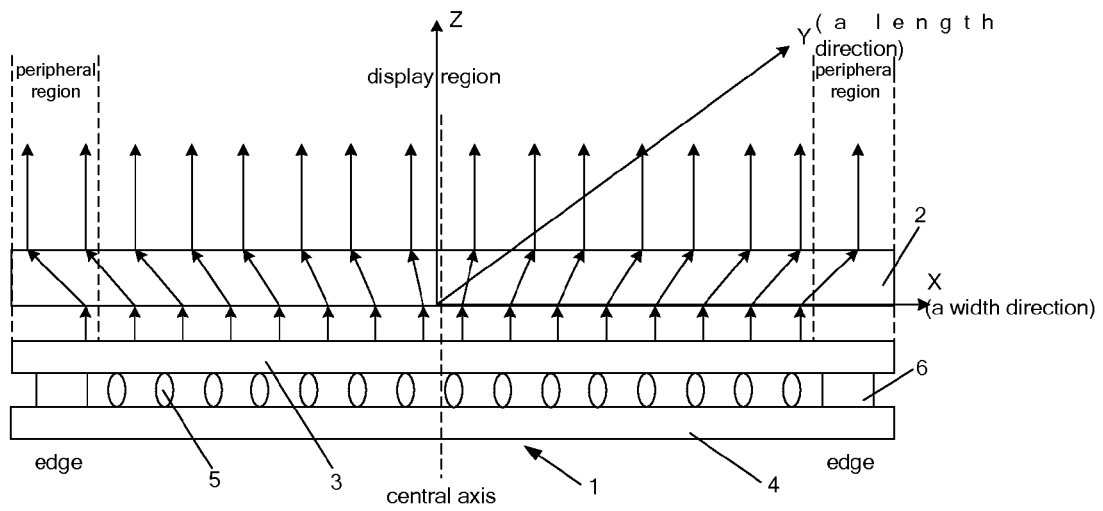
FIG. 2 is an optical path diagram of light emitted from a display panel of the display device of FIG. 1.

FIG. 1 is a cross-sectional structural view of a display device according to an embodiment of the present invention, FIG. 2 is an optical path diagram of light emitted from a display panel of the display device shown in FIG. 1. As shown in FIGS. 1 and 2, the display device includes: a display panel 1 and an optical module 2 disposed on a light-exiting side of the display panel 1, wherein the display panel 1 includes a display region and a peripheral region located at the periphery of the display region, and the optical module 2 is configured to shift light emitted from the display panel 1 towards edges of the display panel 1 so as to make a part of the light enter into the peripheral region and emit out from the peripheral region.

Exemplarily, the display panel 1 shown in FIGS. 1 and 2 is shown as a liquid crystal display panel, however the display panel according to the embodiment of the present invention may be a display panel with a displaying function, such as, an organic light-emitting diode (OLED) display panel, a flexible display panel and an electronic paper, as long as the optical module 2 is disposed on the light-exiting side of these display panels as shown in FIGS. 1 and 2.

Taking a liquid crystal display panel as an example below, the display panel 1 may include: a color filter substrate 3 and an array substrate 4 cell-assembled; a liquid crystal layer 5, filled between the color filter substrate 3 and the array substrate 4; and a seal glue 6, formed at edges of the color filter substrate 3 and the array substrate 4. Furthermore, polarizers (not shown) are disposed respectively at outer sides of the color filter substrate 3 and the array substrate 4. In the embodiment, the optical module 2 is disposed on the light-exiting side of the color filter substrate 3. Exemplarily, the optical module 2 may be directly disposed on the color filter substrate 3 or on the polarizer at a light-exiting side of the color filter substrate 3.

Figure 3:
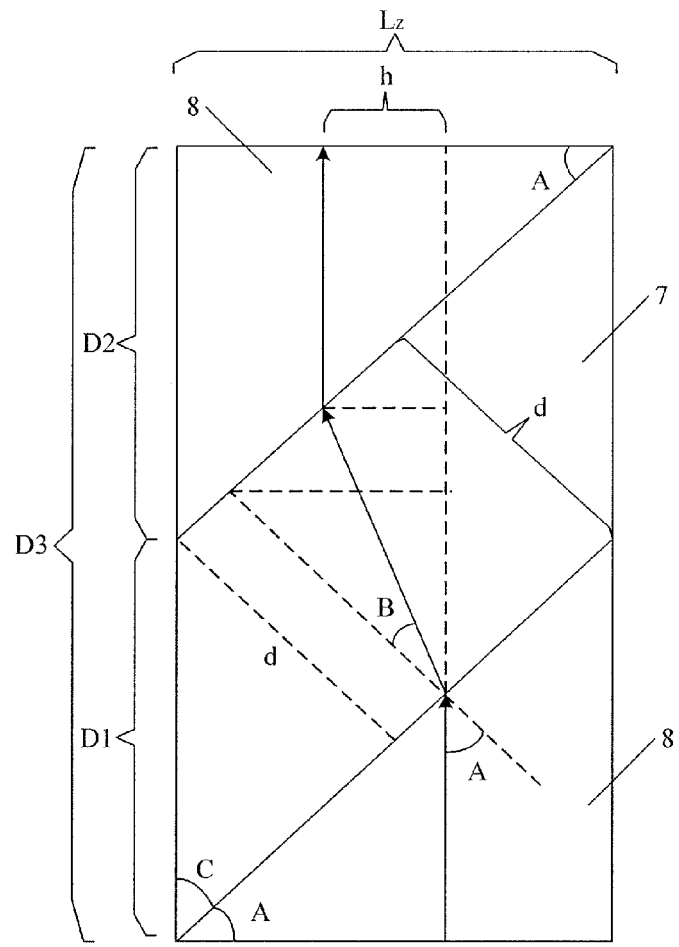
FIG. 3 is a schematic structural view of one unit comprising one refracting layer of an optical module of FIG. 1.

FIG. 3 is a schematic structural view of one unit in the optical module in FIG. 1. As shown in FIG. 3, the optical module 2 may include a refracting layer 7 with a refractive index greater than that of the air. The refracting layer 7 is configured to refract light emitted from the display panel 1 to shift the light towards an edge direction of the display panel 1. Thus, a part of the light can be shifted into the peripheral region. Optionally, the optical module 2 may further include air layers 8, and the refracting layer 7 is sandwiched between two air layers 8. The refractive index of the air layer 8 is equal to that of the air. The air layer 8 is configured to transmit the light emitted from the display panel 1 to the refracting layer 7.

Exemplarily, a procedure for one unit of the optical module shown in FIG. 3 to shift the light emitted from the display panel towards the edge direction of the display panel is as follows: the light emitted from the display panel 1 enters the air layers 8; since the refractive index of the air layers 8 is equal to that of air, the light is not refracted in the air layers 8 and is transmitted into the refracting layer 7 directly by the air layer 8; the light is incident at an incident angle A from a light incident surface of the refracting layer 7 and is refracted in the refracting layer 7, and is incident on a light-exiting surface of the refracting layer 7 at a refraction angle B, wherein the light shift a set distance h; after being refracted again at the light-exiting surface of the refracting layer 7, the light enter into the air layers 8 that transmits the light directly. Of course, if there is no air layer 8, the light emitted from the display panel is incident to the light incident surface of the refracting layer 7 directly at the incident angle A and after being refracted, the light emits out from the refracting layer 7 with an offsetting distance.

In the embodiment of the present invention, the optical module shown in FIG. 1 includes a plurality of units shown in FIG. 3 disposed successively on the light-exiting surface of the display panel.

Figure 4:
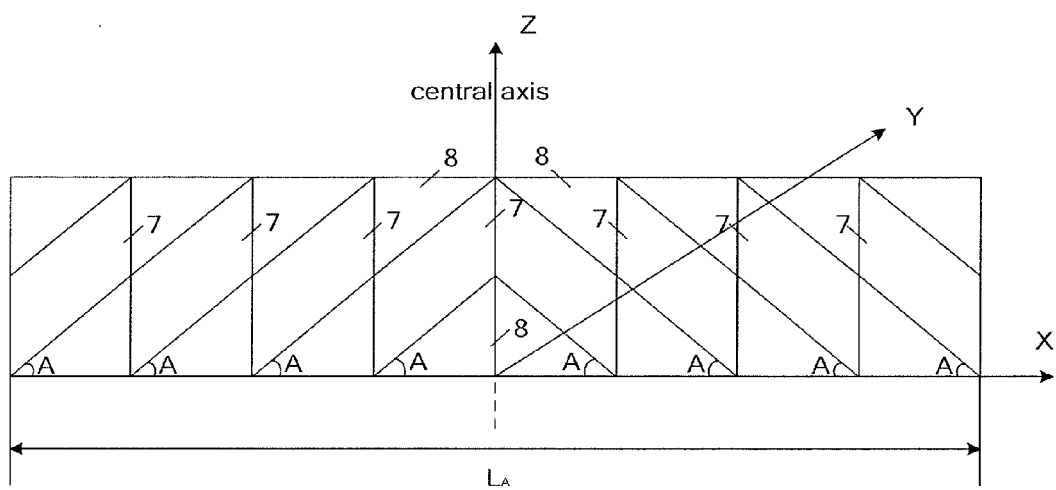
FIG. 4 shows a cross-sectional view of an optical module including a plurality of units shown in FIG. 3 according to an embodiment of the present invention.

Exemplarily, FIG. 4 shows a cross-sectional view of the optical module including a plurality of units shown in FIG. 3 according to an embodiment of the present invention. As shown in FIG. 4, in this embodiment, there are a plurality of the refracting layers 7 disposed successively on the light-exiting surface of the display panel 1 in a direction, i.e., a width direction (for example, a x direction). Likewise, on the light-exiting surface of the display panel, the refracting layers 7 are also successively disposed in the same manner in another direction, i.e., a length direction (for example, a y direction), wherein there is a set angle A between the light incident surface of the refracting layer 7 and the light-exiting surface of the display panel. In FIG. 4, an example in which there are provided 8 refracting layers 7 is shown, in practice, the number of refracting layers 7 may be selected as required and the embodiment of the present invention does not limit this.

Exemplarily, in the embodiment, the refracting layer 7 has a diamond cross-sectional shape, however in practice, the refracting layer 7 may have any other cross-sectional shape, as long as the refracting layer 7 can shift the light being incident from its light incident surface by a certain distance and let it exit out.

In the embodiment of the present invention, as shown in FIGS. 3 and 4, the incident angle at which the light is incident on the refracting layer 7 is equal to the set angle between the light incident surface of the refracting layer 7 and the light-exiting surface of the display panel 1. The refracting layer 7 is used to shift the light towards edges of the display panel 1 by a set distance h. FIG. 3 shows a structure of one unit comprising one refracting layer 7 in the optical module 2.

As shown in FIG. 3, the set distance h may be derived by a geometrical relationship of a triangle as $$h = \frac{d}{\cos B} \cdot \sin(A - B),$$

wherein d is a thickness of the refracting layer 7, n is the refractive index of the refracting layer 7, A is the incident angle of light entering into the refracting layer 7, B is the refraction angle of light in the refracting layer 7. Then, the formula of the incident angle and the refraction angle $$\frac{\sin A}{\sin B} = n$$

is substituted into the above-mentioned formula of the set distance, the set distance h may be derived as $$h = \frac{d}{\sqrt{1 - \left(\frac{\sin A}{n}\right)^2}} \cdot \sin(A - B).$$

It can be seen from the above set distance formula that the set shifting distance of the light is determined by the incident angle A, the refraction angle B, the refractive index n of the refracting layer 7 and the thickness d of the refracting layer 7.

Furthermore, as shown in FIG. 3, in a condition that the incident angle A, the thickness d, a width $L_A$ of the optical module and the number N of the refracting layer are given, a thickness D3 of the optical module 2 may be calculated according to a geometrical relationship of a triangle. According to $$D1 = \frac{d}{\sin C} = \frac{d}{\sin(90° - A)} = \frac{d}{\cos A},$$

$$D2 = L_Z \cdot \tan A = \frac{L_A}{N} \cdot \tan A,$$

it is obtained that $$D3 = D2 + D1 = \frac{d}{\cos A} + \frac{L_A}{N} \cdot \tan A,$$

wherein $L_Z$ is a width of the optical module corresponding to one refracting layer 7. $L_A$ is the width of the entire optical module and when the entire optical module is divided into N equal parts in terms of the number N of the refracting layer, each part is one unit of the optical module shown in FIG. 3, and the width of each unit is $L_Z$ and one unit includes one refracting layer 7.

In the embodiment, when there are a plurality of refracting layers 7, alternatively, the plurality of refracting layers 7 have the identical refractive index n. Of course, the refractive index n of the plurality of refracting layers 7 may also be different, which may determined according to the actual requirements, as long as the refracting layer 7 can shift light emitted from the display panel by a set distance.

Alternatively, as shown in FIGS. 2 and 4, the plurality of refracting layers 7 may be arranged symmetrically about a central axis of the display panel 1.

Exemplarily, as shown in FIG. 4, viewing from a exiting direction of light from the display panel, there is a clockwise angle of greater than 0° and smaller than 90° between the light incident surface of each of the plurality of refracting layers 7 on a left side of the central axis of the display panel 1 and the light-exiting surface of the display panel 1; and there is a counterclockwise angle of greater than 0° and smaller than 90° between the light incident surface of each of the plurality of refracting layers 7 on a right side of the central axis of the display panel 1 and the light-exiting surface of the display panel 1. Thus, light emitted from the display panel will shift towards the edges of the display panel after being refracted by the refracting layers.

The refracting layer 7 in the optical module 2 will be explained in detail with one specific example below. In this example, the number of the refracting layers 7 is 20 and 20 refracting layers 7 are arranged symmetrically about the central axis of the display panel 1. The refractive indexes n of the refracting layers 7 are identical. The incident angle is a set angle, and since the light emitted from the display panel 1 is parallel, the incident angle of the light entering into each of the refracting layers 7 is the same. Data of the refracting layer in the following Table 1 may be obtained according to the above formula of the set distance. Since the 20 refracting layers 7 are symmetrically arranged about the central axis of the display panel 1, the Table 1 only lists data for 10 refracting layers 7.

TABLE 1

| A = 45° | | | n = 1.8 | | |
| --- | --- | --- | --- | --- | --- |
| thickness d of refracting layer (mm) | 0.25 | 0.5 | 0.75 | 1 | 1.25 |
| set distance h (mm) | 0.1 | 0.2 | 0.3 | 0.4 | 0.5 |
| thickness of optical module (mm) | 0.707 | 1.414 | 2.121 | 2.828 | 3.535 |
| thickness d of refracting layer (mm) | 1.5 | 1.75 | 2 | 2.25 | 2.5 |
| set distance h (mm) | 0.6 | 0.7 | 0.8 | 0.9 | 1 |
| thickness of optical module (mm) | 4.242 | 4.949 | 5.656 | 6.363 | 7.07 |

As shown in the Table 1, the refractive index n of the refracting layer 7 is 1.8, and the incident angle A is 45°. As can be known from the above formula of the set distance, in a condition that the refractive index n and the incident angle A (the refraction angle B may be calculated through the formula of the incident angle and the refraction angle according to the refractive index n and the incident angle A) are given, the set distance h is determined by the thickness d of the refracting layer 7 and the set distance h is in direct proportion to the thickness d of the refracting layer 7. Table 1 lists the data for 10 refracting layers 7. The thickness d of the refracting layers 7 ranges from 0.25 mm to 2.5 mm, and accordingly, the set distance h ranges from 0.1 mm to 1 mm, the thickness D3 of the optical module 2 ranges from 0.707 mm to 7.07 mm. That is, the larger the thickness d of the refracting layer 7 is, the larger the shifting distance h of the light is, and the larger the thickness D3 of the optical module 2 is. As shown in FIG. 2, the refracting layer 7 has a thickness that becomes larger from the central axis to the peripheral region. Thus, the closer to the peripheral region, the larger the shifting distance h of the light is, which allows more light to shift to enter into the peripheral region, making the light to better cover the peripheral region.

In the above-mentioned example, the number of the refracting layers 7 is 20. In practice, the number of refracting layers 7 may also be set according to production requirements. The more the number of refracting layers 7 is, the better the visual effect of the display device is.

In the embodiment, the optical module 2 may be adhered to the display panel 1. Alternatively, the optical module 2 may be made of high molecular materials such as plastic. In practice, optionally, the optical module 2 may also be made of glass.

In the embodiment of the present invention, optionally, the display panel 1 may also be an organic light-emitting diode display panel, a flexible display panel or an electronic paper. For these types of display panels, the positional relationship of each display panel and the optical module and the arrangement of the optical module are the same as the liquid crystal display panel. Therefore, no specific description will be given for purpose of brevity.

In the embodiments of the present invention, when light emitted from the display panel shifts to the peripheral region and a user views the display device, the light is emitted from the peripheral region, and thus the peripheral region may also display an image, thereby enlarging the display region of the display device.

The display device provided in the embodiments of the present invention includes a display panel and an optical module disposed on a light-exiting side of the display panel, wherein the optical module is configured to shift light emitted from the display panel towards edges of the display panel, so as to shift a part of the light to enter into the peripheral region, thereby enlarging a display region of the display device and improving the visual effect of the display device. With the technical solution provided in the embodiments of the present invention, since the light may be shifted into the peripheral region, the narrow frame effect of the display device can be realized. An outdoor assembled large screen display device has less strict thickness requirement for the optical module, a relatively thick optical module can be used, thus, the light may be shifted a relatively large set distance, which enable joints of the display device to display an image, thereby realizing seamless joint of the large screen display device.

The embodiment of the invention being thus described, it will be obvious that the same may be varied in many ways. Such variations are not to be regarded as a departure from the spirit and scope of the invention, and all such modifications as would be obvious to those skilled in the art are intended to be included within the scope of the following claims.

The invention claimed is:

1. A display device, comprising:
   a display panel, comprising a display region and a peripheral region around the display region; and
   an optical module, disposed on a light-exiting side of the display panel, the optical module configured to shift light emitted from the display panel towards edges of the display panel so as to make a part of the light shift into the peripheral region and emit from the peripheral region,
   the optical module comprises a refracting layer, wherein a set angle is provided between a light incident surface of each of the refracting layers and a light-exiting surface of the display panel and each of the refracting layers is used to shift the light towards the edges of the display panel by a set distance,
   the set distance h satisfies the formula:

$$h = \frac{d}{\sqrt{1 - \left(\frac{\sin A}{n}\right)^2}} \cdot \sin(A - B),$$

wherein d is a thickness of each of the refracting layers, n is a refractive index of each of the refracting layers, A is an incident angle of light entering into each of the refracting layers, B is a refraction angle of the light in each of the refracting layers, and the incident angle is equal to the set angle.

2. The display device according to claim 1, wherein the refracting layer has a refractive index greater than that of air, and the refracting layer is configured to refract light emitted from the display panel to shift the light towards the edges of the display panel.

3. The display device according to claim 1, wherein the optical module comprises a plurality of refracting layers arranged successively on a light-exiting surface of the display panel in a width direction of the display panel and a length direction of the display panel.

4. The display device according to claim 2, wherein the optical module further comprises air layers sandwiching each of the refracting layers and having refractive index equal to that of air, and the air layers are configured to transmit the light emitted from the display panel to the refracting layer.

5. The display device according to claim 3, wherein each of the plurality of refracting layers has a refractive index that is not equal to each other and is greater than that of air.

6. The display device according to claim 3, wherein each of the plurality of refracting layers has a refractive index that is equal to each other and is greater than that of air.

7. The display device according to claim 2, wherein a cross-sectional shape of each of the refracting layers is diamond.

8. The display device according to claim 3, wherein the plurality of refracting layers are symmetrically arranged about a central axis of the display panel.

9. The display device according to claim 3, wherein when viewing from an exiting direction of the light from the display panel, there is a clockwise angle of greater than 0° and smaller than 90° between a light incident surface of each of the plurality of refracting layers on a left side of the central axis of the display panel and the light-exiting surface of the display panel; and there is a counterclockwise angle of greater than 0° and smaller than 90° between the light incident surface of each of the plurality of refracting layers on a right side of the central axis of the display panel and the light-exiting surface of the display panel.

10. The display device according to claim 3, wherein from the central axis, the more the refracting layer close to the peripheral region, the larger a thickness thereof is.

11. The display device according to claim 1, wherein the display panel is an organic electroluminescence display panel or an electronic paper.

12. The display device according to claim 1, wherein the display panel is a liquid crystal display panel comprising:
    a color filter substrate, provided with a upper polarizer at a light-exiting side thereof;
    an array substrate, cell-assembled with the color filter substrate and provided with a bottom polarizer at a light incident side thereof;
    liquid crystal material, sandwiched between the color filter substrate and the array substrate,
    wherein the optical module is disposed on a light-exiting side of the upper polarizer.

13. The display device according to claim 3, wherein the optical module further comprises air layers sandwiching each of the refracting layers and having refractive index equal to that of air, and the air layers are configured to transmit the light emitted from the display panel to the refracting layer.

14. The display device according to claim 3, wherein a set angle is provided between a light incident surface of each of the refracting layers and a light-exiting surface of the display panel, and each of the refracting layers is used to shift the light towards the edges of the display panel by a set distance.

15. The display device according to claim 3, wherein a cross-sectional shape of each of the refracting layers is diamond.

* * * * *